(12) United States Patent
Yang et al.

(10) Patent No.: US 9,733,623 B2
(45) Date of Patent: Aug. 15, 2017

(54) MICROGRID ENERGY MANAGEMENT SYSTEM AND METHOD FOR CONTROLLING OPERATION OF A MICROGRID

(71) Applicant: ABB Technology AG, Zurich (CH)

(72) Inventors: Fang Yang, Raleigh, NC (US);
Xianyong Feng, Cary, NC (US);
Alexandre Oudalov, Fislisbach (CH);
Zhao Li, Raleigh, NC (US); Zhenyuan Wang, Morrisville, NC (US)

(73) Assignee: ABB Research Ltd., Zurich (CH)

( * ) Notice: Subject to any disclaimer, the term of this patent is extended or adjusted under 35 U.S.C. 154(b) by 486 days.

(21) Appl. No.: 13/955,575

(22) Filed: Jul. 31, 2013

(65) Prior Publication Data
US 2015/0039145 A1 Feb. 5, 2015

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *G05B 13/02* | (2006.01) |
| *H02J 3/00* | (2006.01) |

(52) U.S. Cl.
CPC ............... *G05B 13/02* (2013.01); *H02J 3/00* (2013.01)

(58) Field of Classification Search
CPC .................................. G05B 13/02; H02J 3/00
USPC .................................................. 700/291–298
See application file for complete search history.

(56) References Cited

U.S. PATENT DOCUMENTS

| | | |
|---|---|---|
| 7,343,360 B1 | 3/2008 | Ristanovic et al. |
| 7,991,512 B2 | 8/2011 | Chandra et al. |
| (Continued) | | |

FOREIGN PATENT DOCUMENTS

WO 2013049547 A2 4/2013

OTHER PUBLICATIONS

Bagherian, et al. "A Developed Energy Management System for a Microgrid in the Compeitive Electricity Market." IEEE Bucharest Power Tech Conference, 2009. pp. 1-6.
(Continued)

*Primary Examiner* — Ziaul Karim
(74) *Attorney, Agent, or Firm* — Taft Stettinius & Hollister LLP (57) ABSTRACT

A microgrid includes a plurality of distributed energy resources such as controllable distributed electric generators and electrical energy storage devices. A method of controlling operation of the microgrid includes periodically updating a distributed energy resource schedule for the microgrid that includes on/off status of the controllable distributed electric generators and charging/discharging status and rate of the electrical energy storage devices and which satisfies a first control objective for a defined time window, based at least in part on a renewable energy generation and load forecast for the microgrid. The method further includes periodically determining power set points for the controllable distributed energy resources which satisfy a second control objective for a present time interval within the defined time window, the second control objective being a function of at least the distributed energy resource schedule for the microgrid.

19 Claims, 5 Drawing Sheets

(56) References Cited

U.S. PATENT DOCUMENTS

| | | | | |
|---|---|---|---|---|
| 2008/0179966 | A1* | 7/2008 | Horio | H02J 3/38 307/126 |
| 2010/0179704 | A1* | 7/2010 | Ozog | G06Q 10/06315 700/291 |
| 2010/0198421 | A1* | 8/2010 | Fahimi | H02J 3/32 700/291 |
| 2011/0082597 | A1* | 4/2011 | Meagher | H02J 3/38 700/291 |
| 2011/0231028 | A1 | 9/2011 | Ozog | |
| 2012/0143385 | A1 | 6/2012 | Goldsmith | |
| 2013/0076140 | A1* | 3/2013 | Darden | H02J 3/381 307/64 |
| 2013/0079939 | A1* | 3/2013 | Darden, II | G06Q 10/063 700/291 |
| 2013/0079943 | A1* | 3/2013 | Darden, II | G06Q 50/06 700/297 |
| 2013/0190938 | A1* | 7/2013 | Zadeh | H02J 13/0013 700/291 |
| 2014/0018969 | A1* | 1/2014 | Forbes, Jr. | H02J 3/32 700/295 |
| 2014/0277788 | A1* | 9/2014 | Forbes, Jr. | G05F 1/66 700/286 |

OTHER PUBLICATIONS

Kanchev, et al. "Smart Monitoring of a Microgrid Including Gas Turbine and a Dispatched PV-Based Active Generator for Energy Management and Emission Reduction." IEEE PES Innovative Smart Grid Technologies Conference Europe (ISGT Europe), 2010. pp. 1-8.

Lu, et al. "Strategic Framework of an Energy Mangement of a Microgrid with a Phtovoltaic-Based Active Generator." Advanced Electromechanical Motion Systems & Electric Drives Joint Symposium (Electromotion), 2009. pp. 1-6.

Kanchev, et al. "Energy Management and Operational Planning of a Microgrid with a PV-Based Active Generator for Smart Grid Applications." IEEE Transactions on Industrial Electronics, vol. 58, No. 10. Oct. 2011. pp. 4583-4592.

Borghetti, et al. "An Energy Resource Scheduler Implemented in the Automatic Management System of a Microgrid Test Facility." International Conference on Clean Electrical Power, 2007. pp. 94-100.

Choi, et al. "A Microgrid Energy Management System for Inducing Optimal Demand Response." IEEE International Conference on Smart Grid Communications (SmartGridComm), 2011. pp. 19-24.

Palma-Behnke, et al. "Energy Management System for a Renewable based Microgrid with a Demand side Mangement Mechanism," IEEE Symposium on Computational Intelligence Applications in Smart Grid (CIASG), 2011. pp. 1-8.

Koski, et al. "On the Energy Management in Data Center's Microgrid." IEEE GCC Conference and Exhibition (GCC), 2011. pp. 267-270.

Mohamed, et al. "Power Management Strategy for Solving Power Dispatch Problems in Microgrid for Residential Applications." IEEE International Energy Conference and Exhibition (EnergyCon), 2010. pp. 746-751.

Chen, et al. "Optimal Energy Management of Microgrid Systems in Taiwan." IEEE PES Innovative Smart Grid Technologies (ISGT), 2011. pp. 1-9.

Chen, et al. "Smart Energy Management System for Optimal Microgrid Economic Operation," IET Renewable Power Generation, vol. 5, No. 3, 2010. pp. 258-267.

Parisio, et al. "Energy Efficient Microgrid Management using Model Predictive Control." 50th IEEE Conference on Decision and Control and European Control Conference (CDC-ECC), 2011. pp. 5449-5454.

Sortomme, et al. "Optimal Power Flow for a System of Microgrids with Controllable Loads and Battery Storage." IEEE PES Power Systems Conference and Exposition, 2009. pp. 1-5.

Ghadimi, et al. "Optimal Control and Management of Distributed Generation Units in an Islanded Microgrid." CIGRE/IEEE PES Joint Symposium on Integration of Wide-Scale Renewable Resources into the Power Delivery System, 2009. pp. 1-7.

Mohamed, et al. "System Modeling and Online Optimal Management of Microgrid Using Multiobjective Optimization." International Conference on Clean Electrical Power (POWERENG), 2007. pp. 1-6.

Mohamed, et al. "Microgrid Online Management and Balancing using Multiobjective Optimization." IEEE Power Tech, 2007. pp. 1-7.

Mohamed, et al. "Online Management of Microgrid with Battery Storage Using Multiobjective Optimization." International Conference on Power Engineering, Energy and Electrical Drives (POWERENG), 2007. pp. 639-644.

Colson, et al. "Ant Colony Optimization for Microgrid Multi-Objective Power Management." IEEE PES Power Systems Conference and Exposition, 2009. pp. 1-7.

Bose, et al. "Tieline Controls in Microgrid Applications." iREP Symposium on Bulk Power System Dynamics and Control, 2007. pp. 1-9.

Bose, Sumit. "Update on the Twentynine Palms Marine Base Microgrid." GE Global Research Blog, 2013. Also available at: http://ge.geglobalresearch.com/blog/twentynine-palms-marine-base-microgrid/.

Yan-Hua, et al. "Research on Grid-connected/Islanding Smooth Switching of Micro-grid Based on Energy Storage." IEEE PES Conference on Innovative Smart Grid Technologies—Asia (ISGT Asia), 2012. pp. 1-5.

Zadeh, et al. "Design and Implementation of a Microgrid Controller." Protective Relay, 2011. IEEE. pp. 137-145.

Zadeh, et al. "New Control and Automation System for an Islanded Microgrid with Energy Storage Systems." IEEE PES Conference on Innovative Smart Grid Technologies—Middle East (ISGT Middle East), 2011. pp. 1-7.

Zhou, Zhi. "Bringing the Smart Grid to Military Bases." GE Global Research Blog, 2013. Also available at: http://ge.geglobalresearch.com/blog/bringing-the-smart-grid-to-military-bases/.

* cited by examiner

MICROGRID ENERGY MANAGEMENT SYSTEM AND METHOD FOR CONTROLLING OPERATION OF A MICROGRID

TECHNICAL FIELD

The instant application relates to microgrids, and more particularly to controlling operation of microgrids.

BACKGROUND

A microgrid is a semiautonomous grouping of distributed energy resources (distributed generation and energy storage) and loads within a local area. The loads can be one utility "customer," a grouping of several sites, or dispersed sites that operate in a coordinated fashion. The distributed electric generators can include reciprocating engine generators, microturbines, fuel cells, photovoltaic/solar and other small-scale renewable generators. All controllable distributed energy resources and loads are interconnected in a manner that enables devices to perform certain microgrid control functions. For example, the energy balance of the system must be maintained by dispatch and non-critical loads might be curtailed or shed during times of energy shortfall or high operating costs. While capable of operating independently of the macrogrid (in island mode), the microgrid usually functions interconnected (in grid-connected mode) with a sub-station or grid (i.e. macrogrid), purchasing energy from the macrogrid and potentially selling back energy and ancillary services at different times. Microgrids are typically designed based on the total system energy requirements of the microgrid. Heterogeneous levels of power quality and reliability are typically provisioned to end-uses. A microgrid is typically presented to a macrogrid as a single controllable entity.

Most microgrid control systems adopt either a centralized or distributed mechanism. Distributed microgrid control systems are mostly used in remote area islanded and weakly grid-connected microgrids, in which system stability is a major concern and the control objective is mainly to maintain the microgrid dynamic stability. Centralized microgrid control systems perform the coordinated management of the microgrid in a central controller, which monitors overall system operating conditions, makes optimal control decisions in terms of minimizing operation cost, reduces fossil fuel consumption, provides services for utility grid, etc. and then communicates power set points to distributed energy resources and control commands to controllable loads within the microgrid. Most conventional centralized microgrid control systems implement either a so-called 'day-ahead' DER (distributed energy resource) scheduling process combined with online economic dispatch (ED), or online-ED, across multiple time intervals. These solutions attempt to provide an optimized operation strategy over a predefined period of time while account for the renewable generation and load forecast.

The day-ahead DER scheduling with online ED approach generates an optimal operation plan for the next 24 hour period based on the day-ahead renewable generation and load forecast for the microgrid, and the ED is executed in real time the next day using the day-ahead DER schedule results. Due to imprecise forecasting techniques and high variability in renewable generation and load demand, the DER schedule executed in the day-ahead time frame cannot provide reliable operation planning and therefore adversely affects the online ED.

Online ED over multiple intervals incorporates the most recent generation and load forecast into the operation decision. However, this approach has considerable computation complexity at each execution interval (e.g., every 5 to 15 minutes) in real time to provide the control decision not only for the current interval, but also for future intervals. Due to the heavy computation burden, a simplified optimization, which only considers the power balance of the microgrid, is usually deployed instead of more detailed operating constraints provided by power flow analysis.

SUMMARY

According to the exemplary embodiments described herein, a microgrid energy management system (EMS) is provided that enables secure and economic steady-state operation of a microgrid in both grid-connected and island modes. The microgrid EMS maintains system steady-state economic operation.

According to an embodiment of a method of controlling operation of a microgrid which comprises a plurality of distributed energy resources including controllable distributed electric generators and electrical energy storage devices, the method comprises: periodically updating a distributed energy resource schedule for the microgrid that includes on/off status of the controllable distributed electric generators and charging/discharging status and rate of the electrical energy storage devices and which satisfies a first control objective for a defined time window, based at least in part on a renewable energy generation and load forecast for the microgrid; and periodically determining power set points for the controllable distributed energy resources which satisfy a second control objective for a present time interval within the defined time window, the second control objective being a function of at least the distributed energy resource schedule for the microgrid.

According to an embodiment of a microgrid energy management system for controlling operation of a microgrid which comprises a plurality of distributed energy resources including controllable distributed electric generators and electrical energy storage devices, the microgrid energy management system comprising a processing circuit operable to periodically update a distributed energy resource schedule for the microgrid that includes on/off status of the controllable distributed electric generators and charging/discharging status and rate of the electrical energy storage devices and which satisfies a first control objective for a defined time window, based at least in part on a renewable energy generation and load forecast for the microgrid. The processing circuit is further operable to periodically determine power set points for the controllable distributed energy resources which satisfy a second control objective for a present time interval within the defined time window, the second control objective being a function of at least the distributed energy resource schedule for the microgrid.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

According to the exemplary embodiments described herein, a microgrid energy management system (EMS) is provided that generates optimal dispatch decisions while account for various factors over a certain time period. The microgrid EMS coordinates control actions among various controllable devices within a microgrid over multiple time intervals to implement an overall optimization objective function. For example, the microgrid EMS can use renewable energy generation and load forecast information for a future time period to maximize renewable energy utilization and reduce fossil fuel dependency. In addition, energy storage charge/discharge operation can be optimally scheduled across multiple time intervals so that electrical energy storage devices included in the microgrid can store low-price energy during light-load periods and deliver energy during heavy-load or high-price energy periods.

The microgrid EMS can also leverage the network model of the microgrid. For example, a balanced network mode may not be valid for a particular microgrid. The microgrid EMS can use a detailed unbalanced network model when available, increasing the control complexity and accuracy. The microgrid EMS can consider different operational characteristics when the microgrid operates in different modes (e.g., grid-connected or island modes) and provide corresponding control strategies which enhance the secure and economic operation of the microgrid. The microgrid EMS can also account for physical limitations of the various controllable devices included in the microgrid, such as generator capacity, start-up time, ramping rate, start-up/shutdown/generation costs, energy storage charging/discharging rates, state of charge, etc.

Broadly, the microgrid EMS described herein uses mathematical optimization techniques to address the economic operation of a microgrid so that optimal generation dispatch decisions are made which account for various factors over a certain time period.

Figure 1:
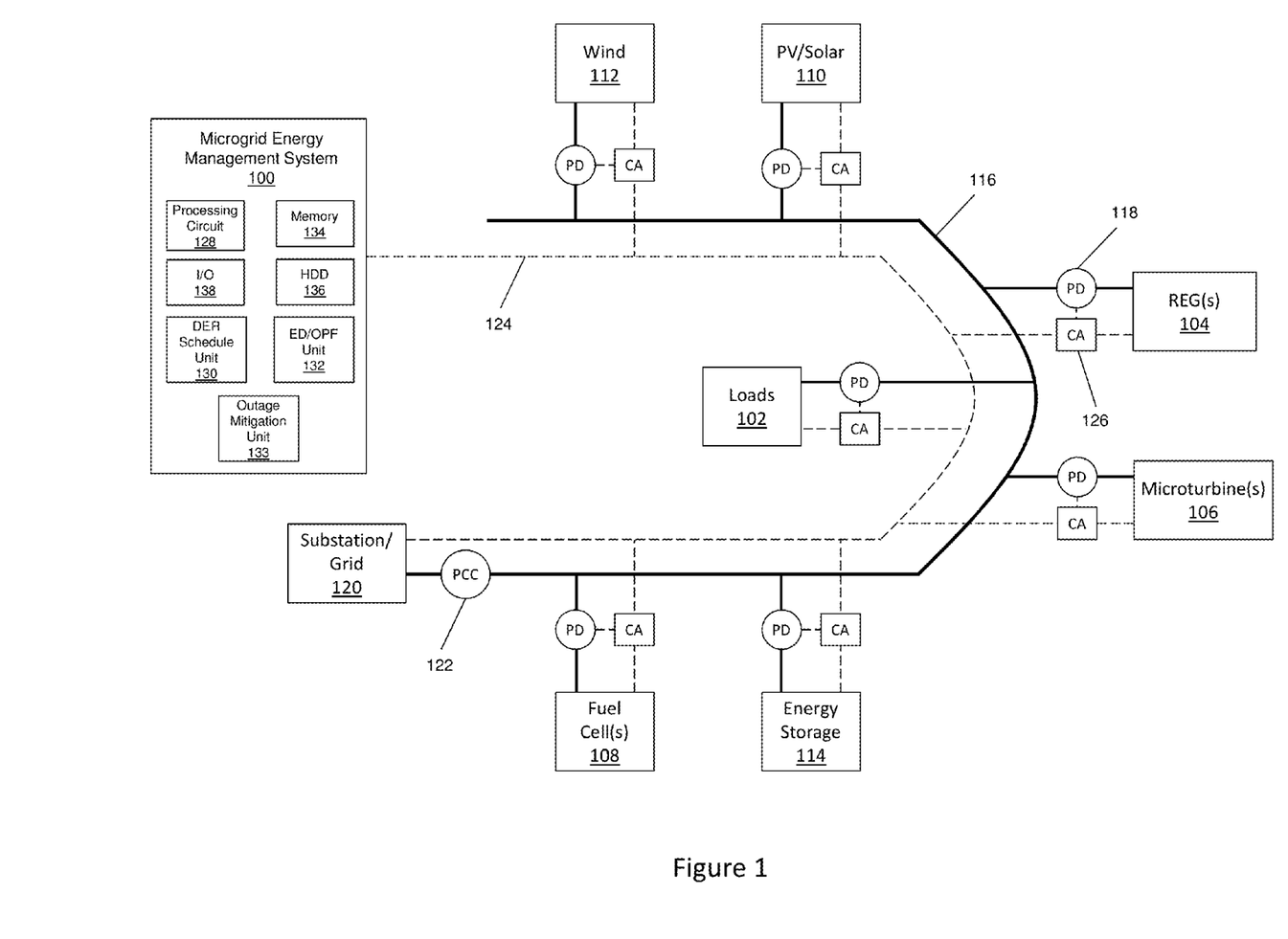
FIG. 1 illustrates a block diagram of an embodiment of a microgrid energy management system for controlling operation of a microgrid.

FIG. 1 illustrates an embodiment of the microgrid EMS 100 and a microgrid controlled by the microgrid EMS 100. The microgrid includes distributed energy resources (DERs) and loads 102 within a local area. The loads 102 can be a single utility customer, a grouping of several sites, or dispersed sites that operate in a coordinated fashion. The DERs can include one or more distributed electric generators such as reciprocating engine generator(s) 104, microturbine(s) 106, fuel cell(s) 108, photovoltaic/solar generator(s) 110, wind turbine(s) 112, and other small-scale renewable generators, and also electrical energy storage devices 114. The DERs and loads 102 are interconnected by an electrical network 116. Each DER and load 102 can be connected to the electrical network 116 by a protection device (PD) 118 such as a fuse, circuit breaker, relay, step-down transformer, etc. The microgrid can be connected to a substation or a macrogrid 120 in a grid-connected mode. One or more points of common coupling (PCC) 122 can be provided for connecting the electrical network 116 of the microgrid to the substation or macrogrid 120. The microgrid can be isolated from all power grids, substations, etc. in an island mode by appropriate control of the PCC 122.

All controllable DERs and loads 102 included in the microgrid are interconnected by a communications and control network 124 so that the controllable devices can perform certain microgrid control functions. The microgrid EMS 100 has remote or direct access to the communications and control network 124 of the microgrid, for controlling the DERs and loads 102 through local control agents (CA) 126. The microgrid EMS 100 comprises a processing circuit 128 which can include digital and/or analog circuitry such as one or more controllers, processors, ASICs (application-specific integrated circuits), etc. for executing program code which performs the energy management control operations described herein. To this end, the microgrid EMS 100 includes a DER schedule unit 130, an ED/OPF (economic dispatch/optimal power flow) unit 132 and an outage mitigation unit 133 included in or associated with the processing circuit 128 for performing the energy management control operations. The microgrid EMS 100 also has one or more storage media such as DRAM (dynamic random access memory) 134 and an HDD (hard disk drive) 136 for storing the program code and related data processed and accessed by the processing circuit 128, DER schedule unit 130, ED/OPF unit 132, and outage mitigation unit 133 during execution of program code. The storage medium also stores the results generated by the microgrid EMS 100.

The microgrid EMS 100 also has I/O (input/output) circuitry 138 for communicating with the controllable DERs and loads 102 over the communications and control network 124 via the local control agents 126. For example, the microgrid EMS 100 can receive renewable energy generation and load forecast information, DER power generation information and other information used in the energy management control operations via the I/O circuitry 138. The microgrid EMS 100 can also communicate power set points and other types of control information generated as part of the energy management control operations described herein to the controllable DERs and loads 102 via the I/O circuitry 138.

Figure 2:
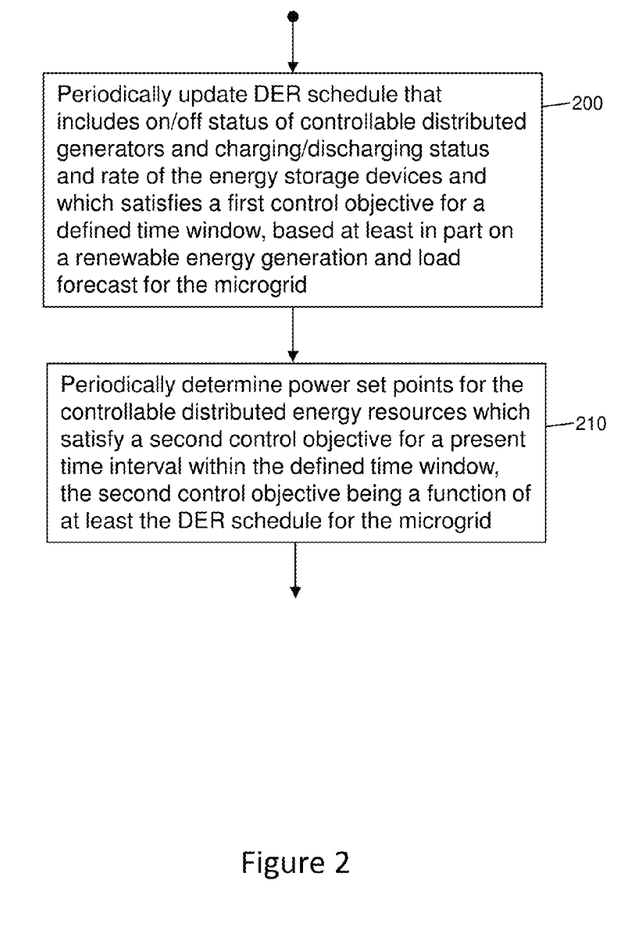
FIG. 2 illustrates a flow diagram of an embodiment of a method of controlling operation of a microgrid.

FIG. 2 illustrates a flow diagram of an embodiment of a method of controlling operation of a microgrid which comprises a plurality of distributed energy resources including controllable distributed electric generators and electrical energy storage devices. The method includes periodically updating a DER schedule for the microgrid (Block 200), e.g. by the DER schedule unit 130 of the microgrid EMS 100. The DER schedule includes the on/off status of the controllable distributed electric generators and charging/discharging status and rate of the electrical energy storage devices included in the microgrid. The on/off status of the controllable distributed electric generators indicates whether each controllable distributed electric generator is online (active) or offline (de-active). The charging/discharging status of the electrical energy storage devices indicates whether each electrical energy storage device is storing (charging) energy or releasing (discharging) energy. The rate indicates how quickly each electrical energy storage device charges or discharges energy. The DER schedule satisfies a first control objective for a defined time window e.g. 24 hours, and is determined based at least in part on a renewable energy generation and load forecast for the microgrid. Any standard methodology can be used to derive the renewable energy generation and load forecast. The method further includes periodically determining power set points for the controllable distributed energy resources which satisfy a second control objective for the present time interval within the defined time window (Block 210), e.g. by the ED/OPF unit 132 of the microgrid EMS 100. The second control objective is a function of at least the distributed energy resource schedule for the microgrid.

Figure 3:
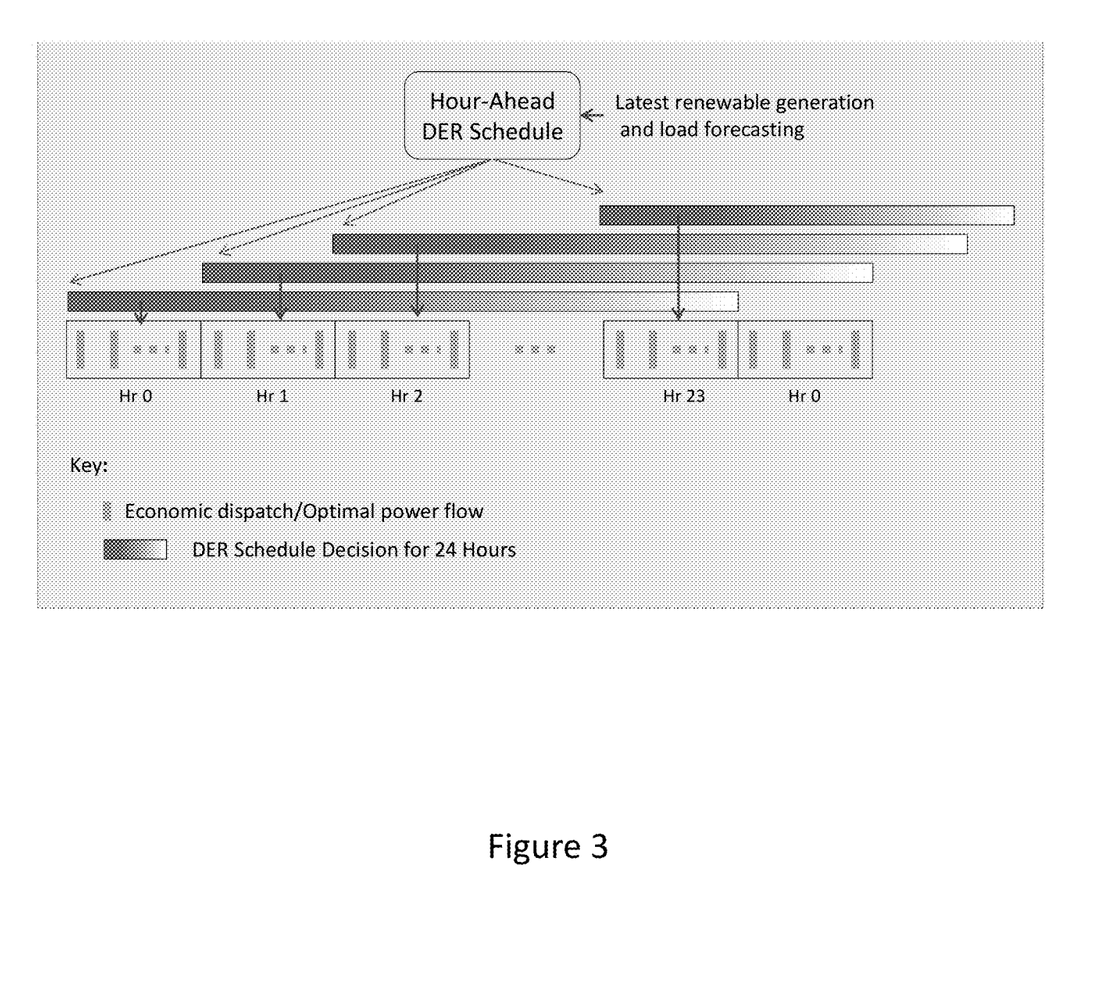
FIG. 3 illustrates a schematic diagram of an embodiment of periodically updating a distributed energy resource schedule for a microgrid and periodically determining power set points for controllable distributed energy resources included in the microgrid.

FIG. 3 illustrates an embodiment of the method of FIG. 2, implemented for an exemplary moving (sliding) 24 hour time window. According to this embodiment, the DER schedule for the controllable distributed electric generators and electrical energy storage devices included in the microgrid is updated every hour ('Hr 0', 'HR 1', . . . , 'HR 23') based at least in part on the latest renewable energy generation and load forecast available for the microgrid. Each DER schedule update yields on/off status of the controllable distributed electric generators and charging/discharging status and rate of the electrical energy storage devices for the next 24 hour window i.e. the defined time window moves (slides) by one hour each update, but still looks out over a 24 hour window. In another embodiment, the DER schedule is updated each time the renewable energy generation and load forecast is revised. In each case, the defined time window (24 hours in this example) moves (slides) by a corresponding amount (1 hour in this example) each time the DER schedule is updated.

Between DER schedule updates, power set points for the controllable distributed energy resources are determined so that a second control objective is satisfied for the present time interval within the 24 hour time window. The power set points can be determined e.g. every 5 to 15 minutes between DER schedule updates. As such, the power set points can be updated multiple times during successive time intervals before the DER schedule is updated again and the defined time window is moved (shifted). In one embodiment, the defined time window is shorter for the island mode than for the grid-connected mode. For example, a 24 hour time window may be used for the grid-connected mode and a 12 hour time window may be used for the island mode. In general, any defined time window can be used such as 48 hours, 36 hours, 24 hours, 12 hours, etc. Also, the power set points for the controllable distributed energy resources can be determined for a present time interval of any desirable length within the defined time window e.g. every 5 to 15 minutes or more or less frequently. According to one embodiment, the DER schedule is updated every hour or less frequently and the power set points for the controllable distributed energy resources are determined every fifteen minutes or more frequently. In each case, a power balance approach can be used for periodically updating the DER schedule and an optimal power flow approach can be used for periodically determining the power set points of the controllable distributed energy resources.

Described next is an embodiment of a power balance approach for periodically updating the DER schedule. The DER schedule unit 130 included in or associated with the microgrid EMS 100 performs a forward-looking DER schedule function for implementing the operation planning that optimizes the DER schedule for a defined time window (e.g., 24 hours in the exemplary embodiment of FIG. 3). The DER schedule function determines the on/off status of the controllable distributed electric generators (DG) included in the microgrid and the charging/discharging status and rate of the electrical energy storage devices (ES) included in the microgrid. The DER schedule function can be executed each time the renewable generation and/or load forecasting is updated, such as every one hour or every two hours. In each execution, the DER schedule function considers the latest renewable generation/load forecast to determine the committed DGs and ESs for every preselected time interval (e.g., every 30 minutes) in the defined time window (e.g., 24 hours). The DER schedule function plans for enough spinning (working) reserve capacity for critical load(s) to improve the operation security in case of contingencies such as unplanned outage events. The DER schedule function also includes constraints such as power balance, DG/ES capacity, energy storage state of charge, etc.

The formulation of the DER schedule function is presented next in more detail. The DER schedule unit 130 included in or associated with the microgrid EMS 100 implements the DER schedule function to generate a DER schedule that satisfies a control objective for the defined time window of interest. In one embodiment, the control objective minimizes the operation cost of the microgrid over the defined time window. Microgrid operation cost constraints can include utility grid electricity price, distributed electric generator startup/shutdown/no-load/generation cost, energy storage costs, etc. The constraint set includes the constraints for power balance, generation power output, security, energy storage charge state (charging or discharging), energy storage charging/discharging rates, etc. The energy storage charging/discharging/stand-by efficiency can be assumed to be 100% and the costs associated with energy storage (e.g. startup/shutdown, charging/discharging, etc.) are assumed to prevent frequent charging and discharging of the electrical energy storage devices in order to prolong battery life. The charging and discharging operation costs of the electrical energy storage devices are used to prevent unexpected utilization of energy storage. The startup/shutdown costs of the electrical energy storage devices are used to prevent frequent charging and discharging. In addition, system loss is assumed to be a certain percentage of the overall loading level. The planning horizon of the DER schedule in the grid-connected mode is usually longer than that in the island mode. For instance in the grid-connected mode, the planning period can be chosen as 24 hours and in the island mode the period can be chosen as 12 hours or less.

In one embodiment, the forward-looking DER schedule function implemented by the DER schedule unit 130 included in or associated with the microgrid EMS 100 satisfies the following cost control objective:

$$\min \Sigma_{t=1}^{T} \{ C_{gdt} P_{gdt} + \Sigma_{dg=1}^{ndg} [S_{dgt} C_{dgt}^{nl} + P_{dgt} C_{dgt}^{pg} + SU_{dgt} C_{dgt}^{su} + SD_{dgt} C_{dgt}^{sd} ] + \Sigma_{es=1}^{nes} [C_{est}^{SUCD} (SU_{est}^{D} + SU_{est}^{C}) + C_{est}^{SCD} (S_{est}^{D} + S_{est}^{C}) ] \} \quad (1)$$

where:

$$P_{gdt} + \Sigma_{dg=1}^{ndg} P_{dgt} + \Sigma_{es=1}^{nes} P_{est} + \Sigma_{ndg=1}^{nndg} S_{ndgt} P_{ndgt} = K_2 P_{Tldt} \ t=1, \ldots, T \quad (2)$$

$$S_{dgt} P_{dg}^{min} \le P_{dgt} \le S_{dgt} P_{dg}^{max} \ dg=1 \ldots n_{dg} \ t=1, \ldots, T \quad (3)$$

$$S_{dgt} \le S_{dg(t-1)} + SU_{dgt} \ dg=1 \ldots n_{dg} \ t=1, \ldots, T \quad (4)$$

$$S_{dgt} \ge S_{dg(t-1)} - SD_{dgt} \ dg=1 \ldots n_{dg} \ t=1, \ldots, T \quad (5)$$

$$\Sigma_{dg=1}^{ndg} S_{dgt} P_{dg}^{max} \ge K_1 P_{clt} \ t=1, \ldots, T \quad (6)$$

$$0 \le S_{ndgt} \le 1 \ ndg=1 \ldots n_{ndg} \ t=1, \ldots, T \quad (7)$$

$$E_{es}^{min} \le E_{est} \le E_{es}^{max} \ es=1 \ldots n_{es} \ t=2, \ldots, T+1 \quad (8)$$

$$E_{est} = E_{es(t-1)} - P_{est}\Delta t \quad es=1 \ldots n_{es} \; t=2, \ldots, T+1 \tag{9}$$

$$S_{est}^C P_{es}^{Cmax} \leq P_{est} \leq S_{est}^D P_{es}^{Dmax} \quad es=1 \ldots n_{es}$$
$$t=1, \ldots, T \tag{10}$$

$$0 \leq S_{est}^C + S_{est}^D \leq 1 \quad es=1 \ldots n_{es} \; t=1, \ldots, T \tag{11}$$

$$S_{est}^C - S_{es(t-1)}^C - SU_{est}^C \leq 0 \quad es=1 \ldots n_{es} \; t=1, \ldots, T \tag{12}$$

$$S_{est}^D - S_{es(t-1)}^D - SU_{est}^D \leq 0 \quad es=1 \ldots n_{es} \; t=1, \ldots, T \tag{13}$$

According to equation (1) the control objective implemented by the DER schedule function minimizes operation cost of the microgrid, where:

T is the number of time intervals considered in the optimization problem;

$n_{dg}$ is the number of controllable distributed electric generators (DGs);

$C_{gd}$ is the cost function of electricity provided from the utility (external) grid;

$P_{gd}$ is the power supplied from the utility (external) grid;

$S_{dg}$ indicates the on/off status of the controllable DGs;

$C_{dg}^{nl}$ is the no load cost of the controllable DGs;

$C_{dg}^{pg}$ is the power generation cost for the controllable DGs;

$P_{dg}$ is the power generation by the controllable DGs;

$SU_{dg}$ is the start-up operation status of the DGs (1=start-up operation, 0=no start-up operation)

$C_{dg}^{su}$ is the start-up cost of the controllable DGs;

$SD_{dg}$ is the shut-down cost of the controllable DGs (1=shut-down operation, 0=no shut-down operation);

$C_{dg}^{sd}$ is the cost of shutting down the controllable DGs;

$n_{es}$ is the number of electrical energy storage (ES) devices;

$C_{es}^{SU_{CD}}$ is the charging/discharging cost for the ES devices;

$SU_{es}^D$ indicates discharging action of the ES devices (1=start-discharging operation, 0=no start-discharging operation;

$SU_{es}^C$ indicates the charging action of the ES devices (1=start-charging operation, 0=no start-charging operation);

$C_{es}^{S_{CD}}$ is the charging/discharging operation cost of the ES devices (e.g. in the DER schedule, the operation cost of the energy storage can increase from the first time interval to the last time interval, which drives the energy storage to charge or discharge as early as possible);

$S_{es}^D$ indicates the discharging status of the ES devices (1=discharging, 0=charging or idle); and $S_{es}^C$ indicates the charging status of the ES devices (1=charging, 0=discharging or idle).

According to equation (1), the control objective is also a function of the energy storage cost associated with the electrical energy storage devices. In one embodiment, the variables $C_{es}^{SU_{CD}}$, $SU_{es}^D$, $SU_{es}^C$, $C_{es}^{S_{CD}}$, $S_{es}^D$ and/or $S_{es}^C$ can be selected so that the term $\Sigma_{es=1}^{n_{es}}[C_{est}^{SU_{CD}}(SU_{est}^D + SU_{est}^C) + C_{est}^{S_{CD}}(S_{est}^D + S_{est}^C)]$ in equation (1) limits the amount of charging/discharging permitted for the electrical energy storage devices over the defined time window so that the energy storage cost is minimized for the defined time window.

Equation (2) is a power balance equation which ensures the total generation is equal to total load demand in each decision time interval. A correction factor K2 can be set to a value other than one to adjust the power balance. Equation (3) represents the power output constraints for the controllable distributed electric generators. Equations (4) and (5) are constraints for start-up and shut-down operation of the distributed electric generators, respectively. Equation (6) is a security constraint which ensures that the total generation capacity of on-line (active) controllable distributed electric generators is larger than the total demand of the critical loads. That is, in the grid-connected mode, the control objective ensures the total power generation capacity of all of the controllable distributed electric generators having an 'on' status as indicated by parameter $S_{dg}$ of the distributed energy resource schedule is greater than a critical load of the microgrid for the defined time window. While in the island mode, a correction factor $K_1$ can be set to a value other than one to account for at least one of the 'on' controllable distributed electric generators being out of service during the defined time window. This way, the total power generation capacity remains greater than the critical load of the microgrid over the defined time window even if an unplanned outage happens such as the disconnection from the main grid (islanding) or one of the controllable distributed electric generators is out of service in island mode.

Equation (7) is a renewable power output constraint for the renewable electric generators included in the microgrid. Equation (8) is the state of the charge constraint for the electrical energy storage devices included in the microgrid. Equation (9) is the charge or discharge constraint for the electrical energy storage devices, where the efficiency of charging/discharging is assumed to be 100%. Equation (10) is a constraint for the electrical energy storage devices between the charging/discharging rate and the status. Equation (11) is an energy storage charging/discharging status constraint. Equations (12) and (13) are constraints related to energy storage start-up charging/discharging operation.

In equations (2)-(13):

$P_{es}$ represents power generation from the electrical energy storage (ES) devices;

$n_{ndg}$ is the number of renewable DGs;

$S_{ndg}$ is the renewable electric generator power coefficient (binary value, if renewable is not continuously controllable; continuous variable between 0 and 1, otherwise);

$P_{ndg}$ is the renewable DG power generation;

$K_2$ is a loss coefficient (e.g. chosen between 1.01-1.05 based on loading level, with other values possible);

$P_{Tld}$ is the total load power demand $P_{dg}^{min}$ represents the controllable DG minimum power output;

$P_{dg}^{max}$ represents the controllable DG maximum power output;

$K_1$ is a security coefficient (1=grid-connected mode, 1.3-1.5=island mode, with other values possible);

$P_{cl}$ is the critical load demand;

$E_{es}^{max}$ is the rated maximum stored energy for the ES devices;

$E_{es}^{min}$ is the rated minimum stored energy for the ES devices;

$E_{es}$ is the amount of energy in the electrical energy storage devices;

$\Delta t$ is the time length for each preselected interval;

$P_{es}^{Dmax}$ is the maximum power discharging rate of the ES devices (>0); and $P_{es}^{Cmax}$ is the maximum power charging rate of the electrical energy storage devices (<0).

The control variables of the DER schedule function are as follows:

$$u_{DER} = [P_{gd}, U_{dg-1} \; U_{dg-2} \ldots U_{dg-n_{dg}}, U_{es-1} U_{es-2} \ldots U_{es-n_{es}}, U_{es-C} U_{es-D}] \tag{14}$$

where:

$P_{gd} = [P_{gd1} P_{gd2} \ldots P_{gdT}]$ (power from external utility grid)
$U_{dg-1} = [P_{dg-1} S_{dg-1} SU_{dg-1} SD_{dg-1}]$ (parameters of DG 1)
$P_{dg-1} = [P_{dg-11} P_{dg-12} \ldots P_{dg-1T}]$
$S_{dg-1} = [S_{dg-11} S_{dg-12} \ldots S_{dg-1T}]$
$SU_{dg-1} = [SU_{dg-11} SU_{dg-12} \ldots SU_{dg-1T}]$
$SD_{dg-1} = [SD_{dg-11} SD_{dg-12} \ldots SD_{dg-1T}]$:
$U_{dg-n_{dg}} = [P_{dg-n_{dg}} S_{dg-n_{dg}} SU_{dg-n_{dg}} SD_{dg-n_{dg}}]$ (parameters of $DG_{n_{dg}}$)
$P_{dg-n_{dg}} = [P_{dg-n_{dg}1} P_{dg-n_{dg}2} \ldots P_{dg-n_{dg}T}]$
$S_{dg-n_{dg}} = [S_{dg-n_{dg}1} S_{dg-n_{dg}2} \ldots S_{dg-n_{dg}T}]$
$SU_{dg-n_{dg}} = [SU_{dg-n_{dg}1} SU_{dg-n_{dg}2} \ldots SU_{dg-n_{dg}T}]$
$SD_{dg-n_{dg}} = [SD_{dg-n_{dg}1} SD_{dg-n_{dg}2} \ldots SD_{dg-n_{dg}T}]$
$U_{es-1} = [P_{es-1} S_{es-1} S_{es-1}^C S_{es-1}^D]$ (parameters of ES 1)
$P_{es-1} = [P_{es-11} P_{es-12} \ldots P_{es-1T}]$
$S_{es-1} = [S_{es-11} S_{es-12} \ldots S_{es-1T}]$
$S_{es-1}^C = [S_{es-11}^C S_{es-12}^C \ldots S_{es-1T}^C]$
$S_{es-1}^D = [S_{es-11}^D S_{es-12}^D \ldots S_{es-1T}^D]$:
$U_{es-n_{es}} = [P_{es-n_{es}} S_{es-n_{es}} S_{es-n_{es}}^C S_{es-n_{es}}^D]$ (parameters of ES $n_{es}$)
$P_{es-n_{es}} = [P_{es-n_{es}1} P_{es-n_{es}2} \ldots P_{es-n_{es}T}]$
$S_{es-n_{es}} = [S_{es-n_{es}1} S_{es-n_{es}2} \ldots S_{es-n_{es}T}]$
$S_{es-n_{es}}^C = [S_{es-n_{es}1}^C S_{es-n_{es}2}^C \ldots S_{es-n_{es}T}^C]$
$S_{es-n_{es}}^D = [S_{es-n_{es}1}^D S_{es-n_{es}2}^D \ldots S_{es-n_{es}T}^D]$
$U_{es-C} = [SU_{es-11}^C \ldots SU_{es-1T}^C | \ldots | SU_{es-n_{es}1}^C \ldots SU_{es-n_{es}T}^C]$ (start-up charging of ES)
$U_{es-D} = [SU_{es-11}^D \ldots SU_{es-1T}^D | \ldots | SU_{es-n_{es}1}^D \ldots SU_{es-n_{es}T}^D]$ (start-up discharge of ES)

The DER schedule function can be formulated as a mixed integer linear programming problem. The control variables include both continuous and binary variables. The continuous control variables include $P_{gd}$, $P_{dg}$, and $P_{es}$. The binary control variables (0 or 1) include $S_{dg}$, $SU_{dg}$, $SD_{dg}$, $S_{es}$, $S_{es}^C$, $S_{es}^D$, $SU_{es}^C$, $SU_{es}^D$. The input information for DER schedule function includes:

- utility electricity price: $C_{gd}$ (t=1, ..., T);
- controllable DG no load/startup/shutdown/generation costs: $C_{dg}^{nl}$, $C_{dg}^{su}$, $C_{dg}^{sd}$, $C_{dg}^{pg}$;
- assumed energy storage charging/discharging and corresponding operation costs: $C_{es}^{SU_{CD}}$, $C_{es}^{S_{CD}}$;
- total load demand power forecast: $P_{Tld}$ (t=1, ..., T);
- renewable DG power generation forecast: $P_{ndg}$ (t=1, ..., T);
- controllable DG minimum and maximum power outputs: $P_{dg}^{min}$ and $P_{dg}^{max}$;
- critical load demand forecast: $P_{cl}$ (t=1, ..., T);
- rated maximum and minimum stored energy: $E_{es}^{max}$ and $E_{es}^{min}$;
- time length for each decision interval: $\Delta t$;
- maximum charging/discharging power rate of energy storage: $P_{es}^{Dmax}$ and $P_{es}^{Cmax}$;
- actual status of charge of each energy storage: $E_{es}^{actual}$ (this value is used to update the initial status of charge of the energy storage at the beginning of each DER schedule execution)

The output of the DER schedule function is a DER schedule including: the on/off status of the controllable distributed electric generators, renewable power output (when renewable is on/off or continuously controllable), and the charging/discharging/idle status and rate of the electrical energy storage devices. The DER schedule is used by the ED/OPF unit 132 of the microgrid EMS 100 to determine the power set points of the distributed energy resources in real-time operation.

Based on the on/off status of the electric generators and the energy storage charging/discharging status and rate included in the DER schedule, the ED/OPF unit 132 minimizes the operation cost of the microgrid for the present time interval (e.g., 5 to 15 minutes) while minimizing the deviation of the energy storage charging/discharging rate. That is, the control objective minimizes the extent by which the actual charging/discharging rate of the electrical energy storage devices deviates from the charging/discharging rate identified for the electrical energy storage devices in the distributed energy resource schedule. The constraints considered by the ED/OPF unit 132 include power balance, ramping rate, energy storage charging/discharging efficiencies, as well as operating constraints such as line current and node voltage limits in case a detailed network model is available for the microgrid. The ED/OPF unit 132 determines the power set points for the controllable distributed energy resources based on the following control objective:

$$\min\{C_{gd}P_{gd} + \Sigma_{dg=1}^{ndg} P_{dg} C_{dg}^{pg} + \Sigma_{es=1}^{nes} w_{es} (P_{es} - P_{es}^{ref})^2\} \quad (15)$$

where:

$$P_{gd} + \Sigma_{dg=1}^{ndg} P_{dg} + \Sigma_{ndg=1}^{nndg} S_{ndgt} P_{ndgt} + \Sigma_{es=1}^{nes} P_{es} = K_2 P_{tld} \quad (16)$$

$$P_{dg}^{min} \leq P_{dg} \leq P_{dg}^{max} \quad dg=1 \ldots n_{dg} \quad (17)$$

$$P_{dg}^{ini} - R_{dg}^D \Delta t \leq P_{dg} \leq P_{dg}^{ini} + R_{dg}^U \Delta t \quad (18)$$

$$P_{es}^{Cmax} \leq P_{es} \leq 0 \text{ or } 0 \leq P_{es} \leq P_{es}^{Dmax} \quad es=1 \ldots n_{es} \quad (19)$$

$$E_{es}^{ini} - \rho_C P_{es} \Delta t \leq E_{es}^{max} \text{ or } E_{es}^{min} \leq E_{es}^{ini} - P_{es} \Delta t / \rho_D \quad es=1 \ldots n_{es} \quad (20)$$

$$I_{ln}^{ini} + \Sigma_{u=1}^{nu} S_u^{Iln} * \Delta u \leq I_{ln}^{max} \quad ln=1 \ldots n_{ln} \quad (21)$$

$$V_{nv}^{min} \leq V_{nv}^{ini} + \Sigma_{u=1}^{nu} S_u^{Vnv} * \Delta u \leq V_{nv}^{max} \quad nv=1 \ldots n_{nv} \quad (22)$$

$$Q_{dg}^{min} \leq Q_{dg} \leq Q_{dg}^{max} \text{ or } V_{dg}^{min} \leq V_{dg} \leq V_{dg}^{max} \quad dg=1 \ldots n_{dg} \quad (23)$$

and where:

$C_{gd}$ represents a cost function of electricity provided from the utility (external) grid;
$P_{gd}$ is the power supplies from the utility grid;
$n_{dg}$ is the number of controllable distributed electric generators (DGs);
$C_{dg}^{pg}$ is the energy generation cost for the controllable DGs;
$P_{dg}$ is the power generation for the controllable DGs;
$K_2$ is a loss coefficient (e.g. chosen between 1.01 and 1.05 based on loading level, other values are possible);
$n_{es}$ is the number of electrical energy storage (ES) devices;
$w_{es}$ is a weight factor for the ES devices;
$P_{es}$ represents power generation of the ES devices;
$P_{es}^{ref}$ represents a power generation reference (determined by the DER schedule) for the ES devices;
$n_{ndg}$ is the number of renewable DGs;
$P_{ndg}$ represents the power generation of the renewable DGs;
$P_{Tld}$ is the total load demand power;
$P_{dg}^{min}$ represents the minimum power output of the controllable DGs;
$P_{dg}^{max}$ represents the maximum power output of the controllable
$P_{dg}^{ini}$ represents the base case power generation of the controllable DGs;
$R_{dg}^U$ is a ramp-up rate of the DGs;
$R_{dg}^D$ is a ramp-down rate of the DGs;
$\Delta t$ is the time interval under consideration;

$P_{es}^{Dmax}$ represents the maximum power discharging rate of the ES devices (>0);

$P_{es}^{Cmax}$ represents the maximum power charging rate of the ES devices (<0);

$E_{es}^{ini}$ is the base case stored energy of the ES devices;

$\rho_C, \rho_D$ represents the charging/discharging efficiency of the ES devices $E_{es}^{max}$ represents the rated maximum stored energy;

$E_{es}^{min}$ is the rated minimum stored energy;

$I_{ln}^{ini}$ is the base case line current magnitude;

$I_{ln}^{max}$ is the line current limit;

$n_{ln}$ is the number of lines with line current constraint violations;

u is a controllable variable;

$S_u^I$ represents sensitivity of the line current with respect to the controllable variable u;

$S_u^V$ represents sensitivity of the node voltages with respect to the controllable variable u;

$V_{nv}^{min}, V_{nv}^{max}$ are the node voltage lower and upper limits, respectively;

$V_{nv}^{ini}$ is the base case node voltage magnitude;

nv is the number of voltages with voltage constraint violations;

$Q_{dg}$ represents the reactive power generation of the controllable DGs;

$Q_{dg}^{min}, Q_{dg}^{max}$ represent the reactive power lower and upper limits of the controllable DGs, respectively;

$V_{dg}$ is the voltage set points of the controllable DGs; and $V_{dg}^{min}, V_{dg}^{max}$ are the voltage set point lower and upper limits of the controllable DGs, respectively.

Equation (15) is an objective function implemented by the ED/OPF unit 132 that minimizes operation cost of the microgrid. The ED/OPF control objective can be weighted based on energy storage as given by the term $\Sigma_{es=1}^{n_{es}} w_{es} (P_{es} - P_{es}^{ref})^2$ in equation (15), where the weighting factor w, is applied to the charging/discharging rate identified for the electrical energy storage devices in the DER schedule. Equation (16) is a power balance equation which ensures total load demand is supplied from generation. In one embodiment, a loss coefficient $K_2$ accounts for planned outages in the microgrid so that load shedding can be minimized over the present time interval i.e. by setting $K_2 > 1$ e.g. between 1.01 and 1.05. Equation (17) defines an operating range on the upper and lower limits of DG active power. Equation (18) provides DG real (P) power output ramp rate constraints. Equation (19) provides electrical energy storage device charging/discharging rate constraints. Equation (20) provides electrical energy storage device state (i.e. charging or discharging) constraints. Equations (21) and (22) provide line current and node voltage constraints, respectively, when a detailed network model is available for the microgrid. The line current and node voltage constraints can include line current and node voltage sensitivity variables, respectively. Equation (23) defines an operating range on the upper and lower limits of DG reactive (Q) power or the voltage setting point.

The control variables of the ED/OPF function are as follows:

In grid-connected mode: $u_{ED/OPF} = [P_{gd} : P_{dg} : P_{es} : Q_{dg}]$, where, $P_{dg} = [P_{dg-1} \ P_{dg-2} \ldots P_{dg-n_{dg}}]$ $P_{es} = [P_{es-1} \ P_{es-2} \ldots P_{es-n_{es}}]$ $Q_{dg} = [Q_{dg-1} \ Q_{dg-2} \ldots Q_{dg-n_{ng}}]$ In island mode: $u_{ED/OPF} = [P_{dg} : P_{es} : \overline{Q}_{dg}]$ where, $P_{dg} = [P_{dg-1} \ P_{dg-2} \ldots P_{dg-n_{ng}}]$ $P_{es} = [P_{es-1} \ P_{es-2} \ldots P_{es-n_{es}}]$ $\overline{Q}_{dg} = [Q_{dg-2} \ldots Q_{dg-n_{dg}}]$ Distributed electric generator DG1, for example the electric generator with the largest capacity, is chosen as a slack generator in island mode. The reactive power (Q) of DG1 is determined by the total load demand and power outputs of the other distributed electric generators. The ED/OPF unit 132 formulates the ED/OPF as a quadratic programming problem. A quadratic term is included in the objective function given by equation (15). All the constraints are linear expressions. The input information for ED/OPF objective function includes:

utility electricity price $C_{gd}$;

controllable DG generation cost $C_{dg}^{pg}$;

ES device charging/discharging power reference determined by DER schedule $P_{es}^{ref}$;

online (active) controllable DGs determined by DER schedule (i.e. status=on);

total load demand power $P_{Tld}$;

renewable DG power generation $P_{ndg}$;

controllable DG minimum and maximum power outputs $P_{dg}^{min}$ and $P_{dg}^{max}$;

controllable DG ramp up/down rates $R_{dg}^U$ and $R_{dg}^D$;

rated ES device maximum and minimum stored energy $E_{es}^{max}$ and $E_{es}^{min}$;

time interval $\Delta t$;

maximum charging/discharging power rate of energy storage $P_{es}^{Dmax}$ and $P_{es}^{Cmax}$;

sensitivity information of operating constraints with respect to the control variables; and line current and node voltage magnitude limits $I_{ln}^{max}$, $V_{nv}^{min}$, and $V_{nv}^{max}$.

The output of ED/OPF objective function includes power set points for the controllable distributed energy resources and energy storage charging/discharging power. Theses control demands can be issued to corresponding devices to operate the microgrid every time interval in operational real time, via the microgrid communications and control network 124.

As previously described herein, power outages can be mitigated by the outage mitigation unit 133 of the microgrid EMS 100 e.g. by setting the loss coefficient $K_2$ appropriately. For planned outages, a more precise and robust solution is provided.

Figure 4:
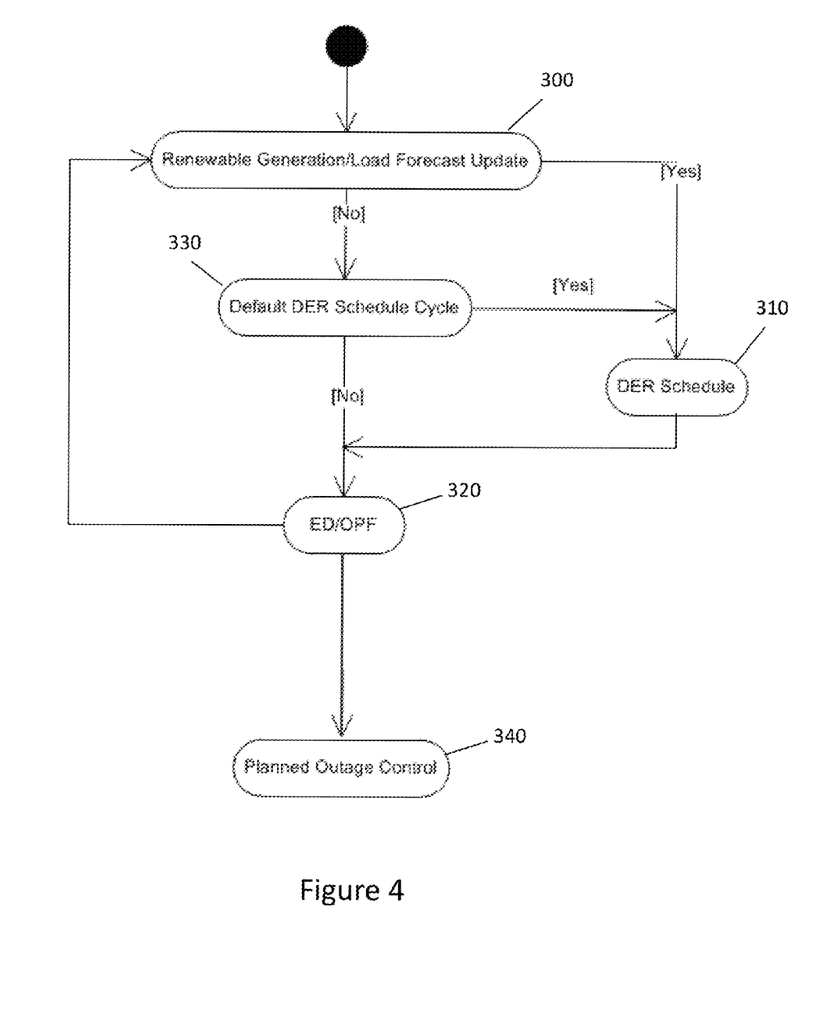
FIG. 4 illustrates a flow diagram of another embodiment of a method of controlling operation of a microgrid.

FIG. 4 illustrates a flow diagram of an embodiment of a method of controlling operation of a microgrid which comprises a plurality of distributed energy resources including controllable distributed electric generators and electrical energy storage devices. If the renewable generation/load forecast is updated (Block 300), the DER schedule unit 130 of the microgrid EMS 100 executes the DER objective function to update the DER schedule (Block 310) e.g. in accordance with equations (1)-(14). The ED/OPF unit 132 executes the ED/OPF objective function based in part on the new DER schedule to determine new power set points for the controllable distributed energy resources (Block 320) e.g. in accordance with equations (15)-(23). Otherwise, the microgrid EMS 100 executes the DER objective function at the normally scheduled interval (e.g. every 1 or 2 hours, with a 24 hour forward-looking window) and then executes the ED/OPF objective function based in part on the new (regularly scheduled) DER schedule (Blocks 330, 320).

For an unplanned disturbance or outage, the DER schedule can plan for enough spinning (working) reserve for the critical loads. When an unplanned outage occurs, both the local control of DG/ES and load shedding mechanism respond automatically to the frequency/voltage variation to adjust the generation output and/or conduct load shedding. For planned outages, the microgrid EMS can implement a planned outage control function (Block 340). The microgrid EMS can implement the planned outage control function to determine the load shedding in advance. In addition, the DER and ED/OPF objective functions can be executed to determine the load shedding as well as power generation re-dispatch among the available distributed electric generators, for instance, to reach zero power exchange with the utility before entering island mode.

Figure 5:
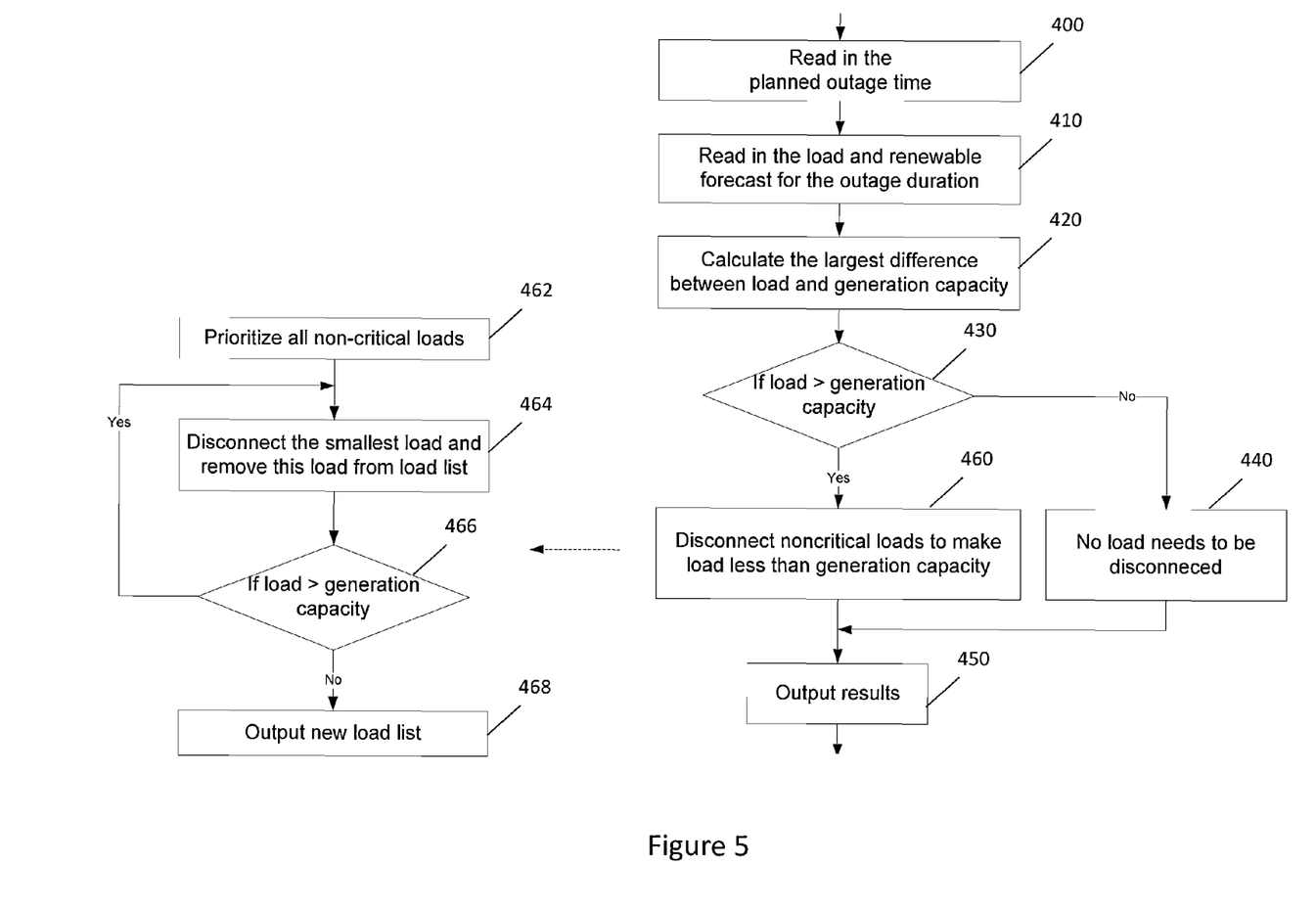
FIG. 5 illustrates a flow diagram of an embodiment of a method of controlling operation of a microgrid, including load shedding.

FIG. 5 illustrates a flow diagram of an embodiment of a planned outage control function implemented by the outage mitigation unit 133 of the microgrid EMS 100. According to this embodiment, the planned outage control function considers a worst-case scenario during an outage. The amount of load shedding is determined based on the maximum mismatch of the generation and load. The load shedding solution is the same during each outage. The planned outage control function uses the planned outage time/schedule (Block 400) and the load demand/renewable generation forecast over the estimated outage duration (Block 410) to calculate whether load shedding is necessary and if so how much load should be shed (Block 420). If load shedding is not required (Block 430), no loads are disconnected (Block 440) and the result is output (Block 450). Otherwise, non-critical loads are prioritized and shed before the outage occurs (Block 460). This can include determining the load shedding list based on heuristic rules so that no optimization is required. This solution is applicable when the estimated outage duration is relatively short such as less than 4 hours.

According to one embodiment of the load shedding (Block 460), the non-critical loads are prioritized (Block 462) and the smallest non-critical load is disconnected and removed from the load shedding list (Block 464). If the load capacity remains above the generation capacity after this modification of the load shedding list (Block 466), the next smallest non-critical load is disconnected and removed from the load shedding list (Block 464). This process is repeated until the load capacity is at or below the generation capacity (Blocks 464, 466) or some other stopping criteria is satisfied. The new load shedding list is output (Block 468) for use during the scheduled outage.

According to another embodiment of the planned outage control function, the entire duration of the outage is considered rather than the worst-case scenario. Operation of the microgrid is also optimized over a time horizon to calculate the DER status and energy storage set points as well as the amount of load shedding in each decision time interval. This formulation is the same as DER schedule function embodiments previously described herein, except load shedding is included. After the amount of load shedding in each interval is determined, a new load shedding list is generated based on the priority of non-critical loads for each time interval. Non-critical loads are shed based on the load shedding list in each decision interval. As such, load shedding is considered over the outage duration which helps to minimize the adverse effects of load shedding. This solution is applicable when the estimated outage duration is relatively long such as longer than 4 hours. The DER schedule function is modified to include load shedding as follows:

$$\min \Sigma_{t=1}^{T\_outage} \{C_{gdt}P_{gdt} + \Sigma_{dg=1}^{ndg}[S_{dgt}C_{dgt}^{nl} + P_{dgt}C_{dgt}^{pg} + SU_{dgt}C_{dgt}^{su} + SD_{dgt}C_{dgt}^{sd}] + \Sigma_{es=1}^{nes} [C_{est}^{SUCD}(SU_{est}^{D} + SU_{est}^{C}) + C_{est}^{SCD}(S_{est}^{D} + S_{est}^{C})] + w_{shed}P_{shedt}\} \quad (24)$$

$$P_{gdt} + \Sigma_{dg=1}^{ndg}P_{dgt} + \Sigma_{es=1}^{nes}P_{est} + \Sigma_{ndg=1}^{nndg}S_{ndgt}P_{ndgt} = K_2(P_{Tldt} - P_{shedt}) t=1, \ldots, T \quad (25)$$

$$P_{shedt} \geq 0 \quad t=1, \ldots, T \quad (26)$$

$$S_{dgt}P_{dg}^{min} \leq P_{dgt} \leq S_{dgt}P_{dg}^{max} \quad dg=1 \ldots n_{dg} \quad t=1, \ldots, T \quad (27)$$

$$S_{dgt} \leq S_{dg(t-1)} + SU_{dgt} \quad dg=1 \ldots n_{dg} \quad t=1, \ldots, T \quad (28)$$

$$S_{dgt} \geq S_{dg(t-1)} - SD_{dgt} \quad dg=1 \ldots n_{dg} \quad t=1, \ldots, T \quad (29)$$

$$\Sigma_{dg=1}^{ndg}S_{dgt}P_{dg}^{max} \geq K_1 P_{clt} \quad t=1, \ldots, T \quad (30)$$

$$0 \leq S_{ndgt} \leq 1 \quad ndg=1 \ldots n_{ndg} \quad t=1, \ldots, T \quad (31)$$

$$E_{es}^{min} \leq E_{est} \leq E_{es}^{max} \quad es=1 \ldots n_{es} \quad t=2, \ldots, T+1 \quad (32)$$

$$E_{est} = E_{es(t-1)} = P_{est} \Delta t \quad es=1 \ldots n_{es} \quad t=2, \ldots, T+1 \quad (33)$$

$$S_{est}^{C}P_{es}^{Cmax} \leq P_{est} \leq S_{est}^{D}P_{es}^{Dmax} \quad es=1 \ldots n_{es} \quad t=1, \ldots, T \quad (34)$$

$$0 \leq S_{est}^{C} + S_{est}^{D} \leq 1 \quad es=1 \ldots n_{es} \quad t=1, \ldots, T \quad (35)$$

$$S_{est}^{C} - S_{es(t-1)}^{C} - SU_{est}^{C} \leq 0 \quad es=1 \ldots n_{es} \quad t=1, \ldots, T \quad (36)$$

$$S_{est}^{D} - S_{es(t-1)}^{D} - SU_{est}^{D} \leq 0 \quad es=1 \ldots n_{es} \quad t=1, \ldots, T \quad (37)$$

where:

$w_{shed}$ is load shedding weighting factor;

$P_{shedt}$ represents an amount of load shedding in time interval t; and $T_{outage}$ is the total outage time.

The remaining variables in equations (24)-(37) are described previously herein with respect to the DER schedule function.

Equation (24) minimizes the operation cost of the microgrid and also minimizes load shedding over the outage duration. Equation (25) ensures that the generation and load are balanced in each time interval. Equation (26) ensures that the amount of load shedding is always positive. Equations (27)-(37) correspond to equations (3)-(13) relating to the DER schedule function.

The control variables of the modified DER schedule function with load shedding are as follows:

$$u_{DER} = [U_{dg-1}U_{dg-2} \ldots U_{dg-n_{dg}} : U_{es-1}U_{es-2} \ldots U_{es-n_{es}} : U_{es-C}U_{es-D} : U_{shed}] \quad (38)$$

where:

$U_{dg-1} = [P_{dg-1}S_{dg-1}SU_{dg-1}SD_{dg-1}]$ (parameters of DG1)
$P_{dg-1} = [P_{dg-11}P_{dg-12} \ldots P_{dg-1T}]$
$S_{dg-1} = [S_{dg-11}S_{dg-12} \ldots S_{dg-1T}]$
$SU_{dg-1} = [SU_{dg-11}SU_{dg-12} \ldots SU_{dg-1T}]$
$SD_{dg-1} = [SD_{dg-11}SD_{dg-12} \ldots SD_{dg-1T}]$:
$U_{dg-n_{dg}} = [P_{dg-n_{dg}}S_{dg-n_{dg}}SU_{dg-n_{dg}}SD_{dg-n_{dg}}]$ (parameters of $DG_{n_{dg}}$)
$P_{dg-n_{dg}} = [P_{dg-n_{dg}1}P_{dg-n_{dg}2} \ldots P_{dg-n_{dg}T}]$
$S_{dg-n_{dg}} = [S_{dg-n_{dg}1}S_{dg-n_{dg}2} \ldots S_{dg-n_{dg}T}]$
$SU_{dg-n_{dg}} = [SU_{dg-n_{dg}1}SU_{dg-n_{dg}2} \ldots SU_{dg-n_{dg}T}]$
$SD_{dg-n_{dg}} = [SD_{dg-n_{dg}1}SD_{dg-n_{dg}2} \ldots SD_{dg-n_{dg}T}]$:
$U_{es-1} = [P_{es-1}S_{es-1}S_{es-1}^{C}S_{es-1}^{D}]$ (parameters of ES1)
$P_{es-1} = [P_{es-11}P_{es-12} \ldots P_{es-1T}]$
$S_{es-1} = [S_{es-11}S_{es-12} \ldots S_{es-1T}]$
$S_{es-1}^{C} = [S_{es-11}^{C}S_{es-12}^{C} \ldots S_{es-1T}^{C}]$
$S_{es-1}^{D} = [S_{es-11}^{D}S_{es-12}^{D} \ldots S_{es-1T}^{D}]$:
$U_{es-n_{es}} = [P_{es-n_{es}}S_{es-n_{es}}S_{es-n_{es}}^{C}S_{es-n_{es}}^{D}]$ (parameter of $ES_{n_{es}}$)
$P_{es-n_{es}} = [P_{es-n_{es}1}P_{es-n_{es}2} \ldots P_{es-n_{es}T}]$
$S_{es-n_{es}} = [S_{es-n_{es}1}S_{es-n_{es}2} \ldots S_{es-n_{es}T}]$
$S_{es-n_{es}}^{C} = [S_{es-n_{es}1}^{C}S_{es-n_{es}2}^{C} \ldots S_{es-n_{es}T}^{C}]$ $S_{es-n_{es}}{}^D = [S_{es-n_{es}1}{}^D S_{es-n_{es}2}{}^D \ldots S_{es-n_{es}T}{}^D]$;
$U_{es-C} = [SU_{es-11}{}^C \ldots SU_{es-1T}{}^C | \ldots | SU_{es-n_{es}1}{}^C \ldots SU_{es-n_{es}T}{}^C]$ (start-up charging of ES devices)
$U_{es-D} = [SU_{es-11}{}^D \ldots SU_{es-1T}{}^D | \ldots | SU_{es-n_{es}1}{}^D \ldots SU_{es-n_{es}T}{}^D]$ (start-up discharging of ES device)
$U_{shed} = [P_{shed1} P_{shed2} \ldots P_{shedT}]$ (amount of load shedding)

The planned outage control is formulated by the outage mitigation unit 133 of the microgrid EMS 100 as a mixed integer linear programming problem. The control variables include both continuous and binary variables. Continuous control variables include: $P_{gd}$; $P_{dg}$; $P_{es}$; and $P_{shed}$. Binary control variables (0 or 1) include: $S_{dg}$; $SU_{dg}$; $SD_{dg}$ $S_{es}$; $S_{es}{}^C$; $S_{es}{}^D$; $SU_{es}{}^C$; $SU_{es}{}^D$. Information input for the planned outage control includes:

controllable DG no load/startup/shutdown/generation costs: $C_{dg}{}^{nl}$, $C_{dg}{}^{su}$, $C_{dg}{}^{sd}$, $C_{dg}{}^{pg}$;

energy storage charging/discharging and corresponding operation costs: $C_{es}{}^{SU_{CD}}$, $C_{es}{}^{S_{CD}}$;

total load demand power forecast during outage: $P_{Tld}$ (t=1, . . . , T);

renewable DG power generation forecast during outage: $P_{ndg}$ (t=1, . . . , T);

controllable DG minimum and maximum power outputs: $P_{dg}{}^{min}$ and $P_{dg}{}^{max}$;

critical load demand forecast during outage: $P_{cl}$ (t=1, . . . , T);

rated maximum and minimum stored energy: $E_{es}{}^{max}$ and $E_{es}{}^{min}$;

time length for each decision interval: $\Delta t$;

maximum charging/discharging power rate of energy storage: $P_{es}{}^{Dmax}$ and $P_{es}{}^{Cmax}$; and outage duration: $T_{outage}$.

The output of the planned outage control function includes: the on/off status of controllable distributed electric generators, renewable power output (when renewable is continuously controllable), charging/discharging/idle status and rate of electrical energy storage devices and a load shedding list.

The microgrid EMS 100 described herein can execute in a central controller of a distributed control system (DCS) and collect information from across the entire microgrid. In the grid-connected mode, stability is not a major issue while the main objective is to achieve economic operation of the microgrid. Usually the local stability control (V/f) is disabled and all units operate in the so-called PQ mode with settings provided by the microgrid 100 EMS unless the microgrid provides ancillary services such as frequency control and voltage regulation to the grid operator. One or more fast responsive DERs such as flywheels can be controlled to respond to system frequency and voltage variation, while the microgrid EMS 100 provides power set points for other energy resources in the desired time interval (e.g. every 5 to 15 minutes) to improve system economic operation. In the island mode, the main objective for microgrid operation is to maintain system stability and guarantee the critical load service, based on which economic operation can be further achieved. The microgrid EMS 100 can provide power set points as a point of reference to the decisions made by the DCS.

The methodologies described herein move operational planning from day-ahead to an hour(s) ahead time frame, which enables the DER schedule to take full advantage of the latest and most accurate generation and load forecasting information. In addition, the proposed DER schedule function can determine the commitment of the DERs in a shorter time length (e.g., every 30 minutes) according to the microgrid scale. These features provide a highly flexible control strategy and yield improved control results for microgrid operation.

Moreover, the microgrid EMS 100 described herein solves the DER schedule when the renewable generation and load forecast is updated and implements the ED/OPF for the present time interval to reduce computational complexity. This allows the incorporation of more detailed operating constraints such as line current and bus voltage constraints i.e. optimal power flow constraints.

To further reduce the computational effort, the execution frequency of the DER schedule can also be adjusted by the scale of the microgrid or the dimension of the optimization problem to be solved. For example, if the optimization problem can be solved fast enough, then the execution of the DER schedule can be done each time when an update in the generation and/or load forecast occurs. Otherwise, the DER schedule can be executed only if there is a change greater than a certain pre-defined threshold.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of controlling operation of a microgrid which comprises a plurality of distributed energy resources including controllable distributed electric generators and electrical energy storage devices, the method comprising:

periodically updating a distributed energy resource schedule for the microgrid that includes on/off status of the controllable distributed electric generators and charging/discharging status and rate of the electrical energy storage devices and which satisfies a first control objective for a defined time window, based at least in part on a renewable energy generation and load forecast for the microgrid;

periodically determining power set points for the controllable distributed electric generators which satisfy a second control objective for a present time interval within the defined time window, the second control objective being a function of at least the distributed energy resource schedule for the microgrid;

periodically updating the distributed energy resource schedule and shifting the defined time window each time-the distributed energy resource schedule is updated, wherein the power set points for the controllable distributed electric generators are determined for at least two successive time intervals within the defined time window before the distributed energy resource schedule is updated again and the defined time window is shifted, wherein:

the first control objective ensures a total power generation capacity of all of the controllable distributed electric generators having an on status as indicated by the distributed energy resource schedule is greater than a critical load of the microgrid for the defined time window; and the first control objective is also a function of a correction factor that accounts for at least one of the controllable distributed electric generators having an on status being out of service during the defined time window so that the total power generation capacity remains greater than the critical load of the microgrid over the defined time window even if the microgrid is disconnected from a main grid or at least one of the controllable distributed electric generators is out of service in an island mode.

2. The method of claim 1, wherein the first control objective is also a function of an energy storage cost associated with the electrical energy storage devices.

3. The method of claim 2, wherein the first control objective limits the amount of charging/discharging permitted for the electrical energy storage devices over the defined time window so that the energy storage cost is minimized for the defined time window.

4. The method of claim 1, wherein the microgrid is configured to be connected to power grids in a grid-connected mode and isolated from all power grids in the island mode, and wherein the defined time window is shorter for the island mode than for the grid-connected mode.

5. The method of claim 1, further comprising:
updating the distributed energy resource schedule each time the renewable energy generation and load forecast is revised.

6. The method of claim 1, wherein the distributed energy resource schedule is updated every hour or less frequently, and wherein the power set points for the controllable distributed electric generators are determined every fifteen minutes or more frequently.

7. The method of claim 1, wherein the second control objective minimizes an operation cost of the microgrid for the present time interval while minimizing the extent by which the actual charging/discharging rate of the electrical energy storage devices deviates from the charging/discharging rate identified for the electrical energy storage devices in the distributed energy resource schedule.

8. The method of claim 1, wherein the second control objective is also a function of line current and node voltage constraints imposed on the microgrid.

9. The method of claim 1, wherein the second control objective is also a function of a weighting factor applied to the charging/discharging rate identified for the electrical energy storage devices in the distributed energy resource schedule.

10. The method of claim 1, wherein the second control objective is also a function of a load shedding variable which accounts for planned outages in the microgrid so that load shedding is minimized over the present time interval.

11. A microgrid energy management system for controlling operation of a microgrid which comprises a plurality of distributed energy resources including controllable distributed electric generators and electrical energy storage devices, the microgrid energy management system comprising a processing circuit operable to:
periodically update a distributed energy resource schedule for the microgrid that includes on/off status of the controllable distributed electric generators and charging/discharging status and rate of the electrical energy storage devices and which satisfies a first control objective for a defined time window, based at least in part on a renewable energy generation and load forecast for the microgrid;
periodically determine power set points for the controllable distributed electric generators which satisfy a second control objective for a present time interval within the defined time window, the second control objective being a function of at least the distributed energy resource schedule for the microgrid;
periodically updating the distributed energy resource schedule and shifting the defined time window each time the distributed energy resource schedule is updated, wherein the power set points for the controllable distributed electric generators are determined for at least two successive time intervals within the defined time window before the distributed energy resource schedule is updated again and the defined time window is moved, wherein:
the first control objective ensures a total power generation capacity of all of the controllable distributed electric generators having an on status as indicated by the distributed energy resource schedule is greater than a critical load of the microgrid for the defined time window; and
the first control objective is also a function of a correction factor that accounts for disconnection from power grids or at least one of the controllable distributed electric generators having an on status being out of service during the defined time window so that the total power generation capacity remains greater than the critical load of the microgrid over the defined time window even if the power grids or the at least one controllable distributed electric generator is out of service in an island mode of operation.

12. The microgrid energy management system of claim 11, wherein the first control objective is also a function of an energy storage cost associated with the electrical energy storage devices.

13. The microgrid energy management system of claim 12, wherein the first control objective limits the amount of charging/discharging permitted for the electrical energy storage devices over the defined time window so that the energy storage cost is minimized for the defined time window.

14. The microgrid energy management system of claim 11, wherein the processing circuit is further operable to:
update the distributed energy resource schedule each time the renewable energy generation and load forecast is revised.

15. The microgrid energy management system of claim 11, wherein the processing circuit is operable to update the distributed energy resource schedule every hour or less frequently and determine the power set points for the controllable distributed electric generators every fifteen minutes or more frequently.

16. The microgrid energy management system of claim 11, wherein the second control objective minimizes an operation cost of the microgrid for the present time interval while minimizing the extent by which the actual charging/discharging rate of the electrical energy storage devices deviates from the charging/discharging rate identified for the electrical energy storage devices in the distributed energy resource schedule.

17. The microgrid energy management system of claim 11, wherein the second control objective is also a function of line current and node voltage constraints imposed on the microgrid.

18. The microgrid energy management system of claim 11, wherein the second control objective is also a function of a weighting factor applied to the charging/discharging rate identified for the electrical energy storage devices in the distributed energy resource schedule.

19. The microgrid energy management system of claim 11, wherein the second control objective is also a function of a load shedding variable which accounts for planned outages in the microgrid so that load shedding is minimized over the present time interval.

* * * * *